US007984506B2

(12) United States Patent
Ueno et al.

(10) Patent No.: US 7,984,506 B2
(45) Date of Patent: Jul. 19, 2011

(54) DIGITAL RIGHT MANAGEMENT SYSTEM, CONTENT SERVER, AND MOBILE TERMINAL

(75) Inventors: Hidetoshi Ueno, Yokosuka (JP); Kentaro Kakami, Yokosuka (JP); Kimihiko Sekino, Tokyo (JP); Shoichi Horiguchi, Yokohama (JP); Hideharu Suzuki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 794 days.

(21) Appl. No.: 11/914,023

(22) PCT Filed: May 10, 2006

(86) PCT No.: PCT/JP2006/309411
§ 371 (c)(1),
(2), (4) Date: Feb. 8, 2008

(87) PCT Pub. No.: WO2006/121084
PCT Pub. Date: Nov. 16, 2006

(65) Prior Publication Data
US 2009/0083857 A1 Mar. 26, 2009

(30) Foreign Application Priority Data

May 11, 2005 (JP) ................................ 2005-138957

(51) Int. Cl.
*G06F 17/30* (2006.01)
*G06F 12/14* (2006.01)
(52) U.S. Cl. .............. 726/26; 726/29; 726/31; 713/193; 705/51
(58) Field of Classification Search .................... 726/26, 726/29–31; 713/193; 705/51, 52, 59; 711/161, 711/162
See application file for complete search history.

(56) References Cited

U.S. PATENT DOCUMENTS

2003/0028592 A1* 2/2003 Ooho et al. .................... 709/203

FOREIGN PATENT DOCUMENTS

| JP | 2003-179590 | 6/2003 |
|---|---|---|
| JP | 2003-288277 | 10/2003 |
| JP | 2003-296484 | 10/2003 |
| JP | 2004-046809 | 2/2004 |
| JP | 2004-126908 | 4/2004 |
| JP | 2004-200845 | 7/2004 |

(Continued)

OTHER PUBLICATIONS

"DRM Content Format", Open Mobile Aliance, Approved Version 1.0, pp. 1-14, 2004; "Rights Expression Language", Open Mobile Alliance, Approved Version 1.0, pp. 1-29, 2004; "Digital Rights Management", Open Mobile Alliance, Approved Version 1.0, pp. 1-20, 2004; "Enabler Release Definition for DRM", Open Mobile Alliance, Approved Version 1.0, pp. 1-13, 2004; "Download Architecture", Open Mobile Alliance, Approved Version 1.0, pp. 1-21, 2004.

(Continued)

*Primary Examiner* — Taghi T Arani
*Assistant Examiner* — Justin T Darrow
(74) *Attorney, Agent, or Firm* — Oblon, Spivak, McClelland, Maier & Neustadt, L.L.P.

(57) ABSTRACT

A digital rights management system (1) includes a content server (30) that stores contents created by content creators, a mobile device (21, 22) that acquires and uses a desired content from the content server, and a data preservation server (40) that preserves the content used by the mobile device so as to enable the content to be uploaded and downloaded. The content server is configured to create rights information for the content, the rights information containing availability of backup saving of the content in the data preservation server, and to deliver the content and the rights information to the mobile device in response to a request from the mobile device. The mobile device is configured to create backup data when using the content based on the availability of backup saving and transmit the backup data to the data preservation server for preservation of the backup data.

9 Claims, 10 Drawing Sheets

FOREIGN PATENT DOCUMENTS

| JP | 2005-55957 | 3/2005 |
|---|---|---|
| WO | 03/083746 | 10/2003 |

OTHER PUBLICATIONS

"OMA DRM Requirements", Open Mobile Alliance, Candidate Version 2.0, pp. 1-22, 2004; "DRM Architecture", Open Mobile Aliance, Candidate Version 2.0, pp. 1-24, 2004.

"Enable Release Definition for DRM V2.0", Open Mobile Alliance, Candidate Version 2.0, pp. 1-14, 2004; "DRM Rights Expression Language V2.0", Open Mobile Alliance, Candidate Version 2.0, pp. 1-43, 2004; "DRM Content Format V2.0", Open Mobile Alliance, Candidate Version 2.0, pp. 1-32, 2004; "DRM Specification V2.0", Open Mobile Alliance, Candidate Version 2.0, pp. 1-145, 2004.

\* cited by examiner

FIG.6

```
<o-ex: rights
    xmlns:o-ex="http://odrl.net/1.1/ODRL-EX"
    xmlns:o-dd="http://odrl.net/1.1/ODRL-DD">
  <o-ex:context>
    <o-dd:version>1.0</o-dd:version>
  <lo-ex:context>
  <o-ex:agreement>
    <o-ex :asset><o-ex : context>
        <o_dd:uid>cid:4567829547 @foo.bar</o-dd:uid>
    </o-ex:context></o-ex:asset>
    <o-ex:permission>
      <o-dd:display>
              <o-dd:constraint>
          <count><fixed> 1 </fixed></count>
        < /o-dd:constraint>
      </o-dd:display>
    </o-ex:permission>
  </o-ex:agreement>
</o-ex:rights>
```

FIG.7

| | 70 |
|---|---|
| 71 — Authorized Usage | |
| Reproduction (audio/midi, video/quicktime, etc) | |
| Display (image/jpg, etc) | |
| Execution (java games, etc) | |
| Hardcopy (image/jpg, text/plain, etc) | |
| 72 — Use Restrictions | |
| Number of Uses | |
| Start Time | |
| Ending Time | |
| Expiration Time from Start Time | |
| Absolute Expiration Time (1 week from acquisition of content) | |
| 73 — Rights Preservation Availability | |
| Rights Preservation Availability Identifier | ~74 |
|   Content    Backup Saving Authorized?    Yes/No | |
|   Rights Information    ditto    Yes/No | |
|   Status Information    ditto    Yes/No | |
|   Annex    ditto    Yes/No | |
|     Memory Info.(e.g. Scratch Pad)    ditto    Yes/No | |
| Data Preservation Server Address | ~75 |

FIG.10

| | | | 80 |
|---|---|---|---|
| 81 | MOBILE DEVICE INFORMATION | | |
| | | MOBILE DEVICE ID | 09012345678 |
| 82 | CONTENT BASIC FIELD | | |
| | | CONTENT ID | uri:abcde.mode.xyz123 |
| | | CONTENT TYPE | audio/midi |
| 83 | CONTENT FIELD | | |
| | | CONTENT | (BINARY DATA) |
| 84 | CONTENT RIGHTS INFORMATION FIELD | | |
| | | RIGHTS INFORMATION | (ODRL XML DATA, ETC.) |
| 85 | STATUS INFORMATION FIELD | | |
| | | REMAINING NUMBER OF USES | 3 |
| | | EXPIRATION DATE/TIME | Wed, 9 Mar 2010 03:03:00:00 +0900 |
| 86 | ANNEX FIELD | | |
| | | MEMORY INFORMATION | (BINARY DATA) |

DIGITAL RIGHT MANAGEMENT SYSTEM, CONTENT SERVER, AND MOBILE TERMINAL

FIELD OF THE INVENTION

The present invention relates to a technique for managing copyright protection of digital contents, and more particularly, to a digital rights management system for managing creator's rights (including the copyright) and the associated information in a mobile communication network, as well as to a content server and a mobile device used in such a management system.

BACKGROUND ART

Unlike tangible entities such as industrial products or food products, digital contents are easily copied and reproduced in the original states. Although unauthorized or illegal reproduction (copying) of contents is banned under the Copyright Law, there are still many unauthorized or illegal copies being made in reality. Robust protection for the copyrights of contents is a major concern of content creators, and is in serious demand.

In recent years and continuing, digital rights management (DRM), a copyright management technique for digital contents, has been attracting attention. At first, DRM techniques applied to music CDs, DVD videos, or digital broadcasting came to the front, and then, the DRM technique applied to mobile or cellular devices has been attracting much attention along with availability of a variety of types of contents and increase of prices.

In response to the demand, standardization of DRM is being promoted by the Open Mobile Alliance (OMA), which is a standards body for the technology of mobile software application elements. With OMA DRM, arbitrary contents delivered to mobile devices are to be protected by not only restricting reproduction or copying of content under the protection of the Copyright Law, but also allowing designation of limitations (limited number of uses or expiration dates for use). The OMA DRM is furnished with various functions responding to the demands from contents providers, and one of such functions is a super-distribution function enabling distribution of digital contents by separating the copyright-protected contents from their rights information.

There are two versions of OMA DRM, namely, OMA DRM version 1.0 (DRMv1.0, see Non-Patent Document 1 listed below), which is a basic technique for less expensive contents, and OMA DRM version 2.0 (DRMv2.0, see Non-Patent Document 2 listed below), which is an advanced technique targeting expensive contents.

FIG. 1 is a schematic diagram illustrating the super-distribution function realized by the OMA DRM. With OMA DRM, the copyright-protected content 1002 and the rights information (rights object) 1003 are separated from each other, and delivered independently from each other. Super-distribution is a delivering scheme that allows free reproduction or redelivering of the content 1002, but values the rights information 1003. The content 1002 is encrypted, and it cannot be used unless the content key contained in the rights information 1003 is acquired. A new content using scheme, in which the user transmits the encrypted content 1002 to a friend by, for example, e-mail and the friend purchases the rights information 1003 by himself (or herself), can be established.

The encrypted content 1002 is binarized according to the DRM content format (DCF). The DRM content format includes a URL of the rights issuer (RI) who holds the rights information 1003. The mobile device 1001 accesses the URL of the rights issuer to request delivery of the rights information 1003 that contains the content key. This arrangement realizes distribution of digital contents, while protecting the digital copyrights through encryption.

Another known technique is a data management service system for cellular phones (see, for example, Patent Document 1 listed below). In this system, to remove inconvenience when the information and data used in an old cellular phone become unavailable when the old one is replaced with a new one, while maintaining protection of the copyrights of the contents such as software applications, the information and data used in a cellular phone are stored in the data management server provided on a network. The information and data items furnished with author's (creator's) IDs are stored in the copyright protection area, and removal or transfer to another storage area is restricted. The data items stored in the copyright protection area can be downloaded only to the cellular phones associated with the protected data items. Accordingly, the contents can be continuously available for the user even if the cellular phone is replaced with a new one because the information and data items are uploaded to and downloaded from the data management server as necessary.

Still another known system is one that uses a license management server. If content downloaded from the network to a cellular phone is not used for a certain period, the license is sent from the cellular phone to be deposited in the license management server on the network in exchange for a certificate or a token. When the content is used again in the cellular phone, the license is acquired from the license management server based upon the certificate or the token. (See, for example, Patent Document 2 listed below).

Under the digital copyright management of the OMA DRM, unrestricted distribution (including transmission) of contents is permitted, but the rights information is prohibited from being freely distributed (including transmission from a cellular phone). If a cellular phone is lost or broken after its content and the associated rights information are acquired, the same content and the rights information have to be acquired again from the content provider. In addition, payment for acquiring the rights information may have to be made again, depending on the situation.

When replacing a cellular phone with a new model, the cellular phone is connected via a memory transfer device to an information processor to electronically read the private data such as telephone numbers out of the memory and to write the data into the memory of the new cellular phone in the shop. To reproduce the contents under the copyright protection, licenses from the content creators are required. However, since it is not easy to obtain a license from each of the creators, the rights information of the protected contents are not written into the new cellular phone. This means that the user cannot continue to use the purchased contents in the new cellular phone.

The data management service system disclosed in Patent Document 1 is designed such that whether to upload the content created by a content creator to the server is determined by the user. In fact, the user has to obtain a license from the content creator or the author to reproduce the copyright-protected content for uploading to the server. However, this system cannot prevent malicious users from uploading or reproducing unauthorized contents in the server, and consequently, the reproduction right of the author is likely to be infringed.

In addition, this publication does not address the issue focused on the rights information of the contents. Restriction on use of content (e.g., limitation of number of uses or expiration date) may be designated in the rights information of the content. Such restriction information is status information that changes every time the content is used. However, the conventional data management service system only handles the issues occurring in uploading and downloading data and information to and from the server, and it does not deal with the procedure required when the status information has varied along with use of the content. If the cellular phone is lost, the current limitation or restriction information as to the use of the content cannot be taken over to a new cellular phone. For example, if up to five times use is permitted in the rights information, and if the user has reproduced the content three times on the cellular phone, then two more uses are left for the user. However, there is no disclosure about how to deal with the status information representing two more chances to reproduce the content being left. Thus, the status information cannot be correctly taken over when the cellular phone is replaced with a new one.

In the system of Patent Document 2 that supplies a license exchange certificate or token to the cellular phone, the license exchange certificate itself is lost if the cellular phone is lost, and therefore, the license deposited in the server cannot be returned to the cellular phone. This publication does not disclose procedures for reissue or takeover of the license exchange certificate by the new cellular phone. After all, a new license has to be acquired.

[Non-Patent Document 1] Open Mobile Alliance, "OMA Digital Rights Management Enabler Release", Approved Version 1.0, OMA-DRM-V1_0-20040615-A, June 2004, www.openmobilealliance.org.

[Non-Patent Document 2] Open Mobile Alliance, "OMA Digital Rights Management Enabler Release", Approved Version 1.0, OMA-DRM-V2_0-20040715-C, July 2004, www.openmobilealliance.org.

[Patent Document 1] JP (Kokai) 2004-200845 A

[Patent Document 2] JP (Kokai) 2003-179590 A

SUMMARY OF INVENTION

Problem to be Solved by the Invention

The present invention was conceived in view of the above-described problems, and it is one of the objectives of the invention to provide a digital rights management system that allows authorized digital content, the associated rights information, status information as to restriction of use, and other necessary information to be continuously used in a new mobile device including a cellular phone, even if the old one is lost or replaced. It is another one of the objectives of the invention to provide a content server and a mobile device used in the digital rights management system.

Means for Solving the Problem

To achieve the objectives, rights information is created based on availability of backup saving of each content, and backup data containing content using status information and rights information are produced every time the content is used or reproduced in a mobile device. The produced backup data are stored and managed in a server on a network.

In the first aspect of the invention, a digital rights management system comprising a content server configured to store contents created by content creators, a mobile device configured to acquire and use a desired content from the content server, and a data preservation server configured to preserve the content used by the mobile device so as to enable the content to be uploaded and downloaded is provided. In this system, the content server is further configured to create rights information for the content, the rights information containing availability of backup saving of the content in the data preservation server, and to deliver the content and the rights information to the mobile device in response to a request from the mobile device. The mobile device is further configured to create backup data when using the content based on the availability of backup saving and transmit the backup data to the data preservation server for preservation of the backup data.

In the second aspect of the invention, a mobile device used in the above-described system is provided. The mobile device comprises:
(a) digital rights management means configured to acquire a content and its associated rights information from a content server on a network, manage the rights information and a using status of the content, and determine availability of backup saving of the content based on the rights information; and
(b) backup means configured to create backup data containing the using status of the content and the rights information in using the content if it is determined that the backup saving of the content is available, and save the created backup data in a data preservation server on the network.

For example, the digital rights management means acquires the backup data from a data preservation server upon input of a backup data acquiring instruction.

In the third aspect of the invention, a content server is provided. The content server comprises:
(a) a content saving unit configured to store a content created by a content creator;
    a determination unit configured to determine whether backup saving of the content is authorized;
(b) a rights information creating unit configured to create rights information that contains a determination result as to availability of the backup saving of the content; and
(c) a content/rights information delivering unit configured to deliver the content and the rights information in response to a content acquiring request from a mobile device.

Preferably, the rights information includes a determination result indicating availability of backup saving and an address of a data preservation server for saving backup data of the content.

Advantages of the Invention

Even if a mobile device is replaced with a new one, previously available digital contents, the associated rights information, status information as to restriction of use of the contents, and other necessary information can be continuously used in the new device.

BRIEF DESCRIPTION OF THE DRAWINGS

FIG. 6 is an example description of OMA DRM rights information generated by the content server;

FIG. 7 is an example of the data structure of the rights information;

FIG. 10 is an example of the data structure of the backup data created by the backup agent.

DESCRIPTION OF SYMBOLS

Figure 1:
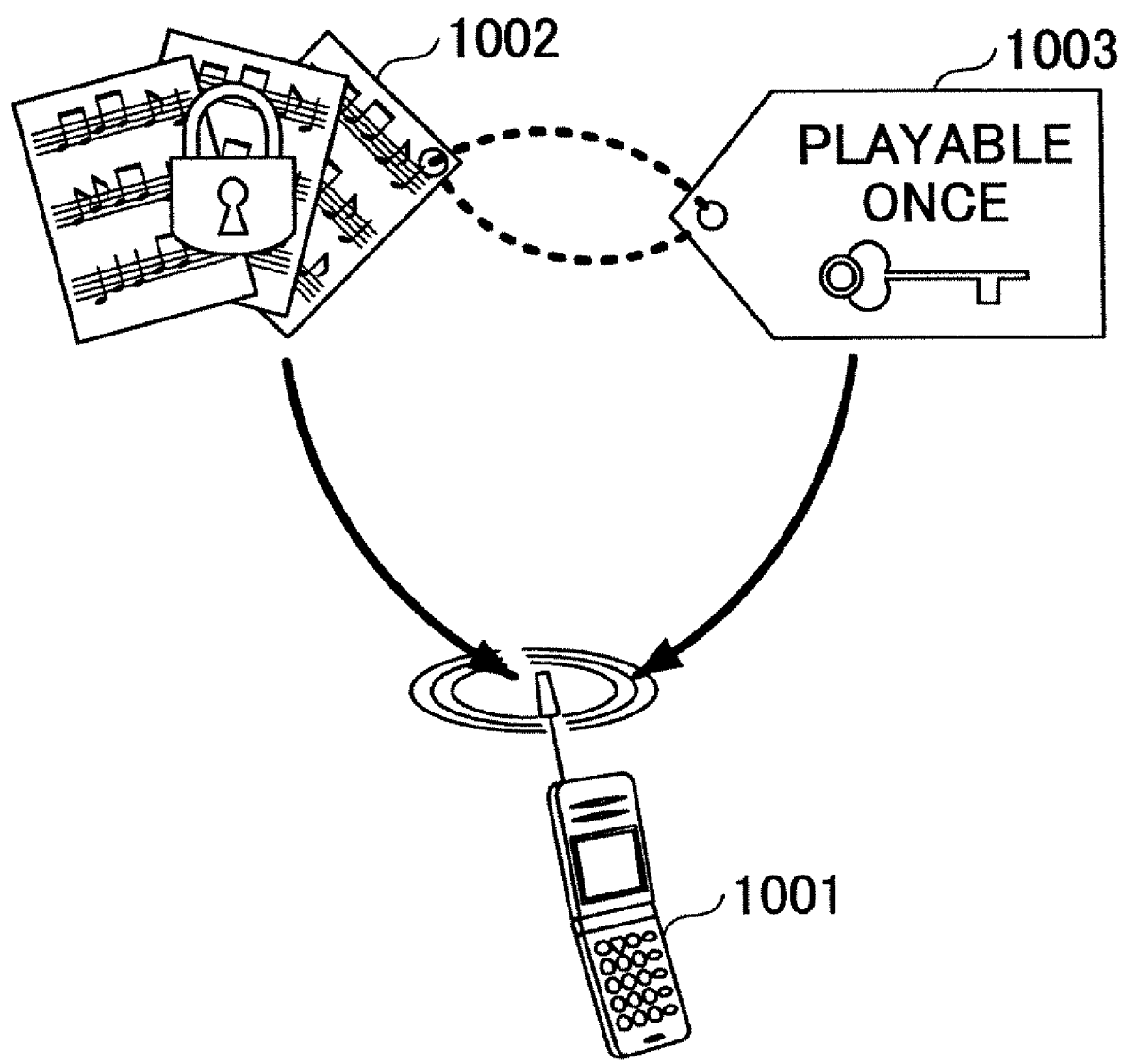
FIG. 1 is an illustration for explaining OMA DRM super-distribution.

1: digital rights management system
21, 22: mobile device
30: content server
40: data preservation server
70: rights information
73: rights preservation availability information
80: backup data
201: DRM agent
202: data storage
203: backup agent
204: contents application
301: contents/rights information delivering unit
302: contents storing unit
303: rights information storing unit
304: backup saving availability determination unit
305: rights information creating unit

BEST MODE TO CARRY OUT THE INVENTION

The preferred embodiments are now described below in conjunction with the attached drawings. In the figures referred to in the description below, the same elements are denoted by the same numerical symbols.

(Overall System Structure)

Figure 2:
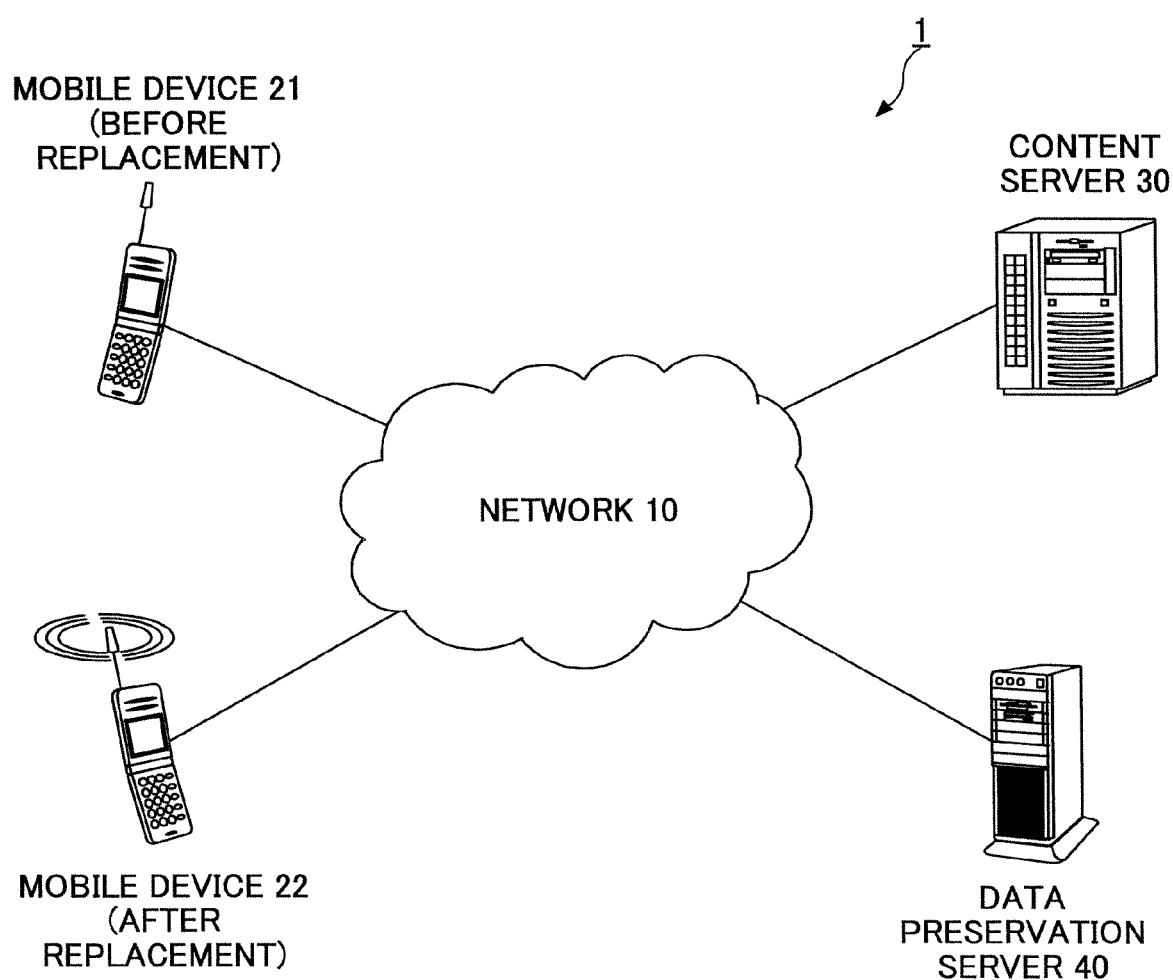
FIG. 2 is a schematic diagram illustrating an example of a digital rights management system according to an embodiment of the invention.

FIG. 2 is a schematic diagram of a digital rights management system 1 according to an embodiment of the invention. The digital rights management system 1 includes mobile devices 21 and 22, a content server 30, and a data preservation server 40, which are connected to each other via a network 10. Each of the mobile devices 21 and 22, the content server 30 and the data preservation server 40 has hardware resources, such as a CPU, memory/storage devices, and an input/output device, and software resources stored in the storage.

The content server 30 holds arbitrary contents including images, motion pictures, music, and programs, and rights information about each of the contents. The content server 30 may be split into two units based on the first function for holding the contents and the second function for holding the rights information, as in the OMA DRM system, or alternatively, these two functions may be combined into a single unit. In this embodiment, the contents and the associated rights information are held in the content server 30.

When delivering content to the mobile device 21 or 22 in response to a request, the content server 30 transmits the associated rights information that contains an information item representing whether reproduction of the content for the purpose of backup saving is authorized by the copyright owner.

The mobile device 21 or 22 stores the content with authorization for backup saving, together with the status information indicating the using status, in the data preservation server 40.

The data preservation server 40 stores the data transmitted from the mobile devices 21 and 22, and it supplies the stored data to the mobile devices 21 and 22. In other words, the mobile devices 21 and 22 upload and download data to and from the data preservation server 40.

Figure 3:
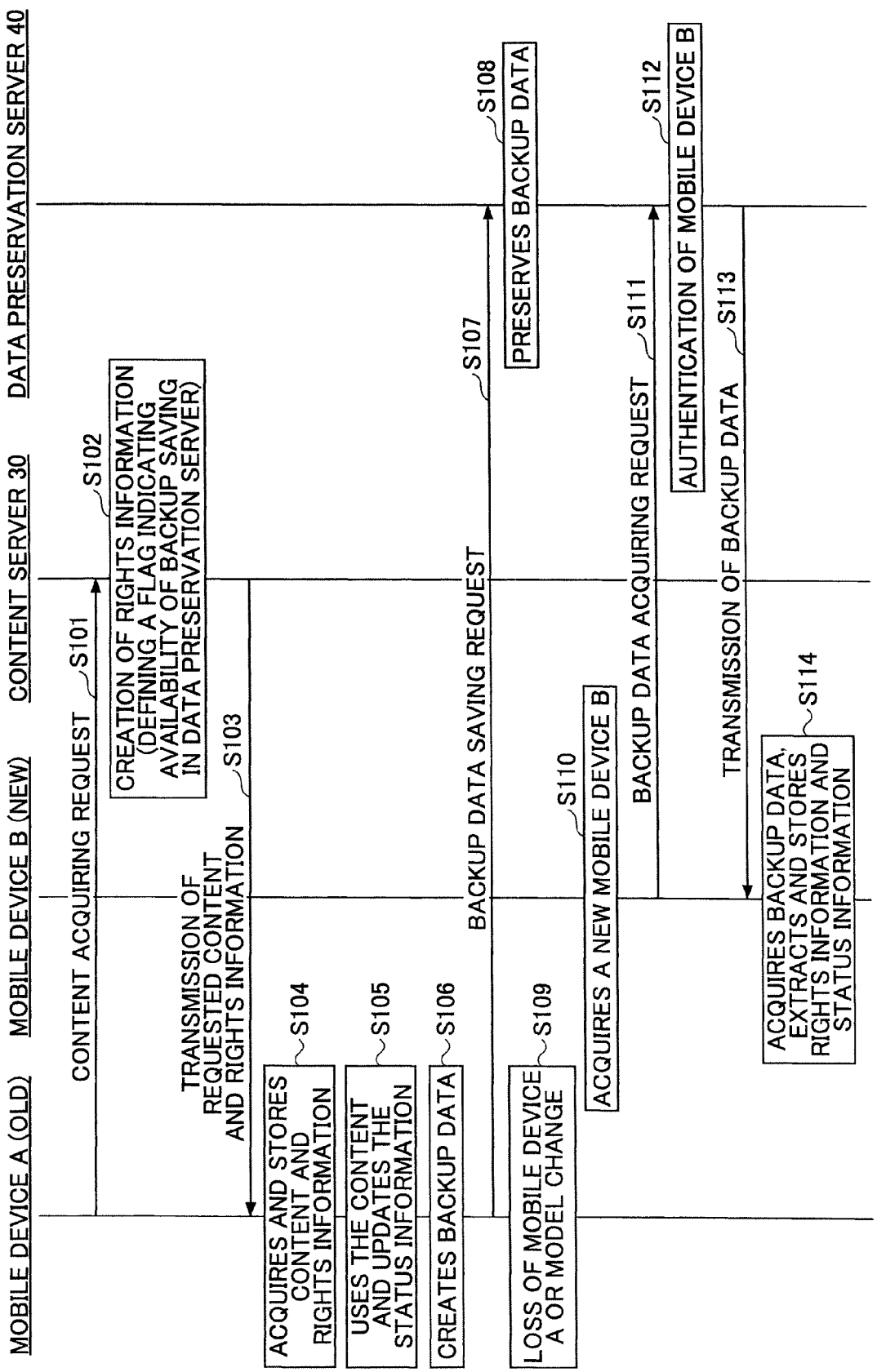
FIG. 3 is a sequence diagram illustrating an example of the processing procedure performed in the digital rights management system shown in FIG. 2.

FIG. 3 is a sequence diagram illustrating operations of the digital rights management system 1 shown in FIG. 2. In this example, the user replaces the mobile device A with a mobile device B.

The mobile device A transmits a request for acquiring a desired content to the content server 30 (S101). The content server 30 creates rights information, which information may include restricted usage, authorized number of uses and the expiration date designated by the content creator having the copyright. The content server 30 adds an information item (backup saving availability flag) indicating whether backup saving of the content in the data preservation server 40 is available, to the created rights information (S102). Then, the content server 30 transmits the rights information, together with the requested content, to the mobile device A (S103).

The mobile device A stores the acquired content and the associated rights information (S104). Every time the content is used or reproduced, the status information including the remaining number of uses and time to expiration is updated (S105), and backup data are generated (S106). The mobile device A transmits a request for saving the backup data to the data preservation server 40 (S017). The data preservation server 40 stores the backup data (S108).

When the user replaces the mobile device A with a mobile device B due to loss or model change (S109 and S110), the new mobile device B transmits a backup data acquiring request to the data preservation server 40 (S111). The data preservation server 40 authenticates that the mobile device B is owned by the same user as the mobile device A (S112), and transmits the backup data to the mobile device B (S113).

Having acquired the backup data, the mobile device B extracts the content, the rights information, and the status information from the backup data, and stores these data and information items (S114).

In this manner, the content server 30 creates for each of the contents an information item indicating availability of backup saving in the data preservation server 40 based on authorization of the copyright owner of the content, and adds the backup saving availability information to the rights information. If backup saving is permitted, each of the mobile devices 21 and 22 creates backup data that contains the status information representing the status of the authorized right, and saves the backup data in the data preservation server 40 every time the content is used. Consequently, even if an old mobile device is lost or replaced with a new model, the new mobile device B can take over the legally acquired content and the associated rights information as they are.

Figure 4:
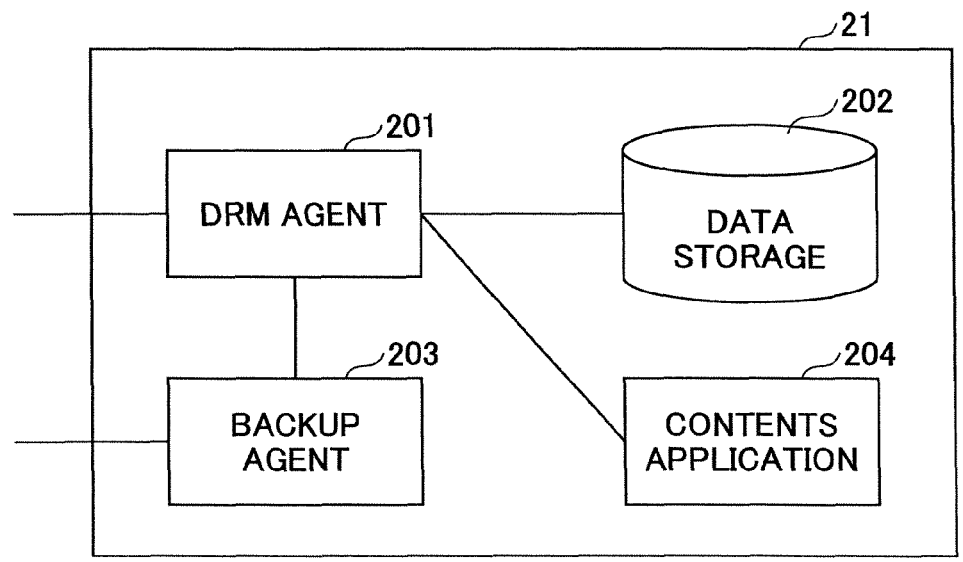
FIG. 4 is a schematic block diagram of a mobile device used in the system according to an embodiment of the invention.

FIG. 4 is a schematic block diagram of the mobile device 21 (or 22), which may be a cellular phone, a personal digital assistant (PDA), a portable notebook computer, or any other mobile terminal.

The mobile device 21 has a DRM agent 201, a data storage 202, a backup agent 203, and contents application 204.

The DMA agent 201 operates as an agent defined by OMA DRM. The DRM agent 201 acquires a desired content and the associated rights information from the content server 30, and manages the content using status based on the descriptions of the rights information every time the content is used by the contents application 204.

The contents application 204 is used to offer the content to the user, and examples of the contents application 204 include music players, video viewers, and game applications.

The data storage 202 stores the content acquired by the DRM agent 201. The content or data stored in the data storage 202 is protected so as to prevent any access other than by the DRM agent 201.

When the content is used by the contents application 204, the backup agent 203 receives the data or information to be backed up from the DRM agent 201, and determines whether backup saving in the data preservation server 40 is authorized for the received data. If backup saving is authorized, the backup agent 203 creates backup data and transmits the backup data to the data preservation server 40.

More detailed operations of the mobile device 21 will be described later.

Figure 5:
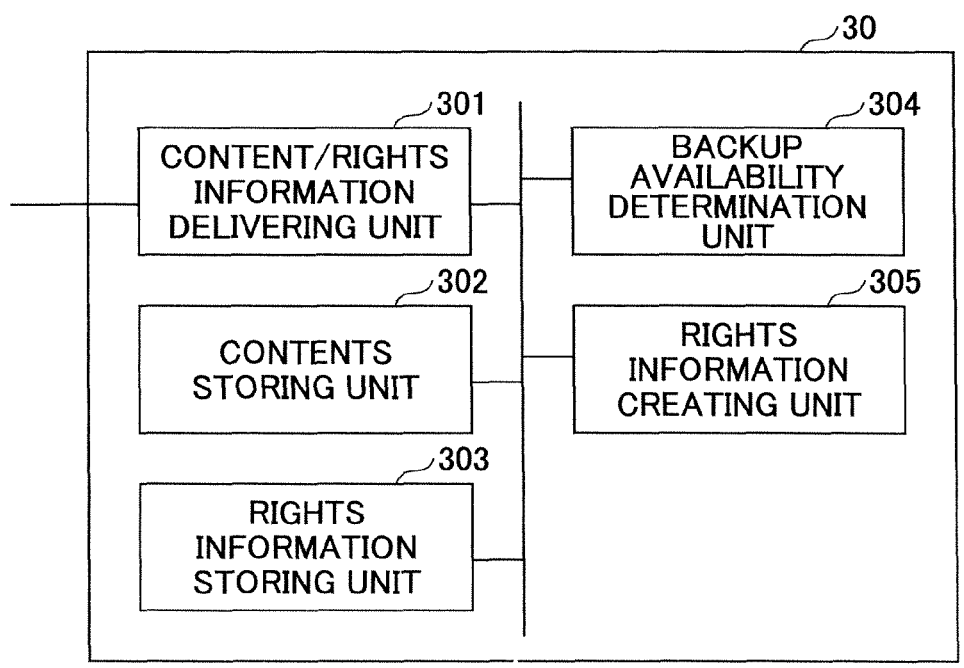
FIG. 5 is a schematic diagram of a content server according to an embodiment of the invention.

FIG. 5 is a schematic block diagram of the content server 30. The content server 30 has a content/rights information delivering unit 301, a content storing unit 302, a rights information storing unit 303, a backup availability determination unit 304, and a rights information creating unit 305. The content storing unit 302 stores contents created by content creators. The rights information creating unit 305 creates rights information for each of the contents. The backup availability determination unit 304 determines whether backup saving in the data preservation server 40 is authorized by the content creator having the copyright for each of the contents, and supplies backup saving availability information to the rights information creating unit 305. The rights information creating unit 305 adds the backup saving availability information to the rights information. The rights information storing unit 303 stores the created rights information in association with the corresponding content. Upon a request from the mobile device 21 or 22, the content/rights information delivering unit 301 delivers the requested content and the associated rights information to the mobile device 21 or 22.

FIG. 6 illustrates OMA DRM information which is an example of the rights information used in the embodiment. In OMA DRM, the rights information is described using the extensible markup language (XML) based on open digital rights language (ODRL). The rights information may include restriction on usage of the content, the limited number of uses, and the expiration date designated by the content creator or the copyright owner.

FIG. 7 is an example of the data structure of the rights information 70 created by the content server 30 and having backup saving availability information. In this example, the rights information 70 includes authorized usage information 71, use restriction information 72, and rights preservation availability information 73 indicating availability of backup saving of the content.

Authorized use information 71 designates usage of the contents, such as reproduction, display, execution, or hardcopy, authorized by the content creator or the copyright owner. The use restriction information 72 includes, in this example, the authorized number of uses, start time of the authorized use period, ending time, expiration time from the start time, and absolute expiration time (one week from acquisition of content).

Rights preservation availability information 73 includes a rights preservation availability identifier 74 that indicates whether the associated content is permitted to be saved in the data preservation server 40, and address information 75 that indicates the address of the data preservation server 40.

The rights preservation availability identifier 74 has four information items; content, rights information of the content, status information about the rights information, and annex information, where each of the items has an indication whether backup saving is permitted. For example, if backup saving is possible, a flag is set for the associated information item. The annex information has a sub-item, such as a scratch pad or other memory information. The sub-item also has an indication about availability of backup saving. The content information in the rights preservation availability identifier 74 is for the content acquired by the mobile device 21 or 22 from the content server 30. The rights information is one associated with the content. The details of the status information about the rights information and the annex information will be described below.

The data preservation server address 75 denotes the address of the data preservation server 40 accessible from the mobile devices 21 and 22 for uploading and downloading data.

For example, when arbitrary content is registered in the content server 30, the content server 30 queries the content creator as the copyright owner whether reproduction of the content can be authorized for the backup purpose. If reproduction for the backup purpose (that is, backup saving in the data preservation server 40) is authorized, the flag of the item "content" managed under the rights preservation availability identifier 74 of the rights information 70 is set "YES". If authorization cannot be obtained from the content creator (copyright owner), the flag of the item "content" managed under the rights preservation availability identifier 71 is set "NO". The content creator having the copyright can designate a server in which the backup data are to be preserved, using the server address.

Figure 8:
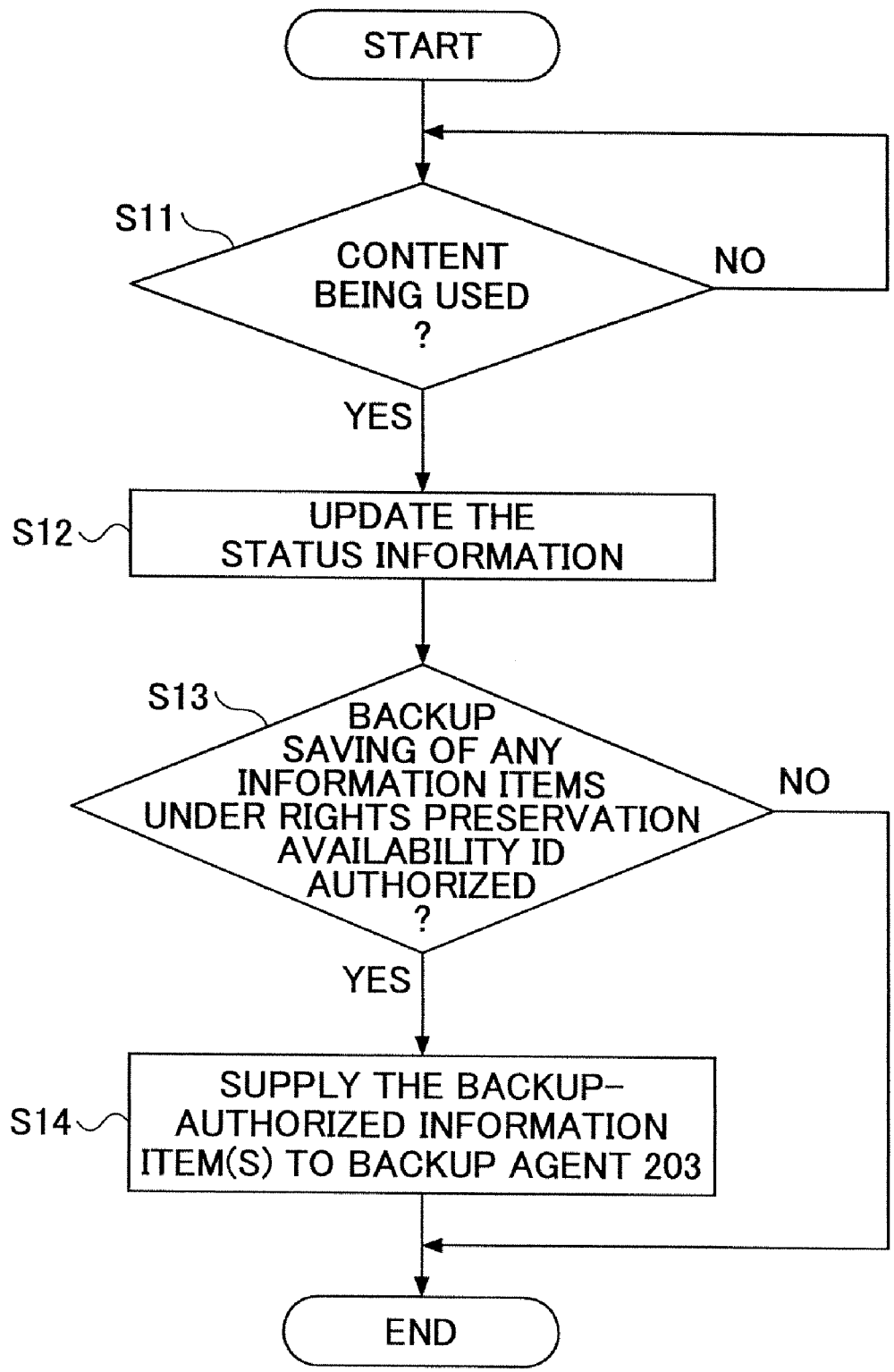
FIG. 8 is a flowchart of updating the status information performed by the DRM agent of the mobile device shown in FIG. 4.

FIG. 8 is a flowchart of the updating operations of the status information carried out by the mobile device 21 (or 22) during the use or reproduction of the content downloaded from the content server 30. Prior to the operation flow, the DRM agent 201 of the mobile device 21 acquires a desired content and the associated rights information from the content server 30 in response to the user's instruction, and stores them in the data storing unit 202. The stored content and the rights information are managed so as to be inaccessible except from the DRM agent 201.

Upon an instruction from the user to use the content (YES in S11), the DRM agent 201 takes the content and the rights information out of the data storing unit 202, and performs a necessary process to decode the content into the executable state. The decoded content is supplied to the contents application 204.

When the content is used through the contents application 204, the DRM agent 201 updates the status information to monitor the using status of the content (S12). The status information represents the intermediary state of the content using process, and this information is necessary to correctly deal with the content in complying with the restriction on the usage designated in the rights information 70. The status information includes the remaining number of uses, time validity information, and other necessary information. The remaining number of uses is a value calculated by subtracting the number of actual uses of the content from the authorized number of uses designated in the rights information. The time validity information includes time to the expiration represented by at least one of the information items selected from ending time, period of validity from the start time of using the content, and the absolute expiration time contained in the rights information. The status information is updated every time the content is used.

When the status information has been updated, the DRM agent 201 determines whether the content, the rights information of the content, the status information about the rights information, and the annex information can be transmitted to the data preservation server 40 (S13). To be more precise, the DRM agent 201 checks the descriptions in the rights preservation availability identifier 74 to determine which of the information items among the content, the rights information, the status information, and the annex information is/are permitted to be backed up in the data preservation server 40. For example, if the information items "content" and "rights information" represent availability ("YES"), it means that the content creator (copyright owner) has agreed to restricted reproduction of the content and the rights information for the backup purpose.

If there are any information items in the rights preservation availability identifier 74 indicating authorization for backup saving in the data preservation server 40 (YES in S13), the DRM agent 201 supplies information about which items are to be backed up in the backup agent 203 (S14).

Figure 9:
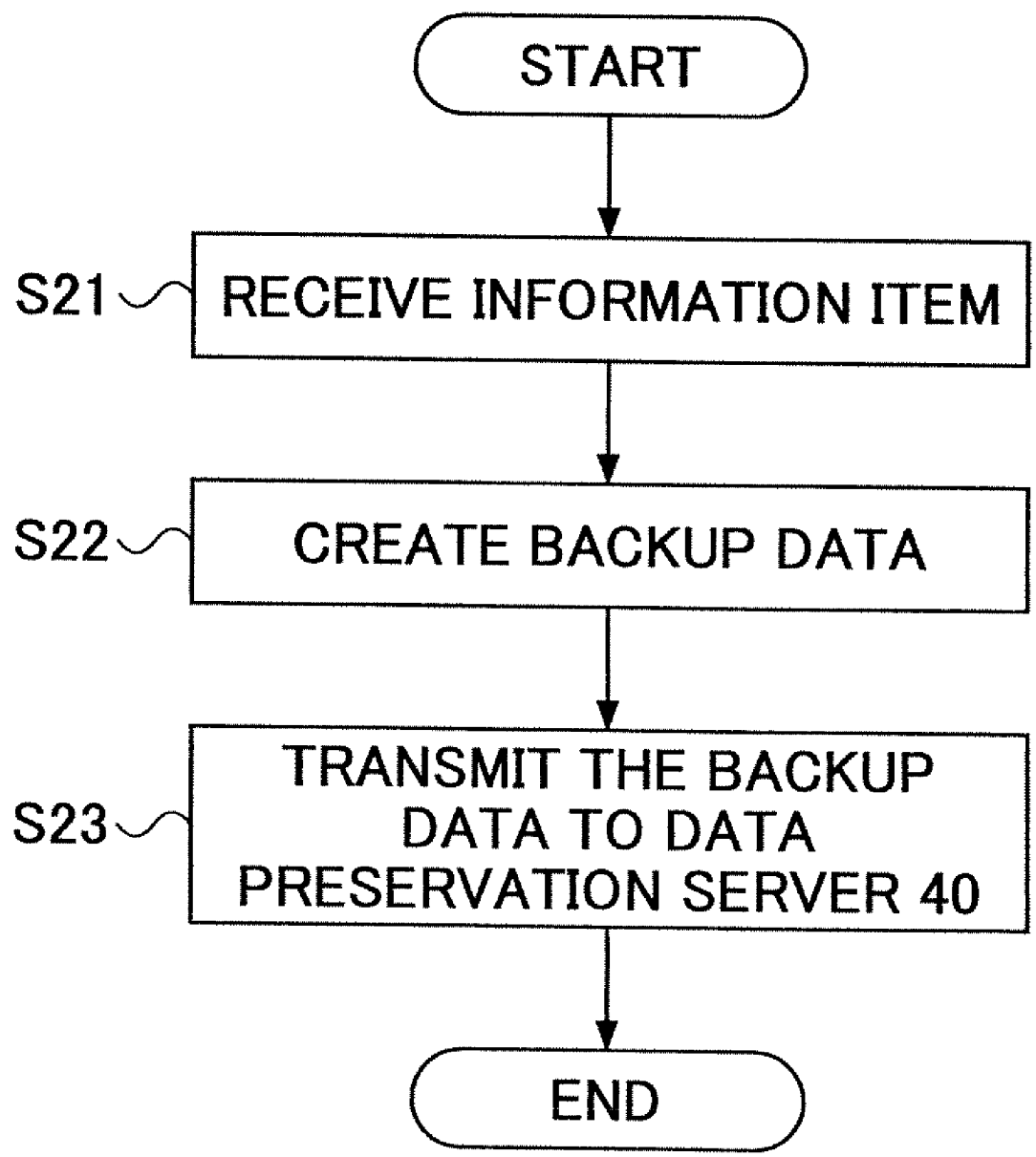
FIG. 9 is a flowchart of creating backup data performed by the backup agent of the mobile device shown in FIG. 4.

FIG. 9 is a flowchart showing the operations of the backup agent 203 of the mobile device 21 (or 22). Upon receiving the information about backup from the DRM agent 201 (S21), the backup agent 203 creates backup data (S22).

FIG. 10 is an example of the data structure of backup data 80. In this example, the backup data 80 include mobile device information 81, content basic field 82, content field 83, content rights information field 84, status information field 85, and annex field 86. The mobile device information 81 contains ID information of the mobile device creating the backup data 80. The content basic field 82 contains the content ID unique to each of the contents, and content type specifying the media type of the content. The content field 83 contains the content itself. The content rights information field 84 contains the rights information of the content. The status information field 85 contains status information representing the using state of the content managed by the DRM agent 201. The annex field 86 contains other related information. Those information items not being transmitted to the data preservation server 40 may not be contained in the backup data 80.

Examples of the related information of the content contained in the annex field 86 include, for example, scratch pad when the content is a Java (registered trademark) application for cellular phones. The scratch pad is a memory area in which the progress of a game is recorded when the game is interrupted. When the game is resumed, the recorded data are read out of the scratch pad.

Returning to FIG. 9, when the backup data have been created, the backup agent 203 transmits the backup data to the data preservation server 40 (S23). It is unnecessary for the backup agent 203 to newly create and transmit all the fields of the backup data 80 every time backup is required. For example, every-time transmission of the scratch pad in the annex field 86 leads to undesired consumption of the network resources because of the increased size. Accordingly, it is desired not to include the data unnecessary to be transmitted to the data preservation server 40 in the backup data 80.

Upon receiving the backup data from the mobile device 21, the data preservation server 40 authenticates the mobile device 21. To authenticate the mobile device 21, the password, the telephone number serving as the identifier of the mobile device 21, an international mobile subscriber identity (IMSI), or an electronic certificate may be used. The data preservation server 40 has a data preservation area to save data under each mobile device identifier, and the backup data transmitted from the mobile device 21 is stored in the corresponding block of the data preservation area. Access to this block from any other device is prohibited, and only the mobile device 21 can access the block.

If the mobile device 21 is replaced with a new mobile device 22, the new mobile device 22 acquires the backup data from the data preservation server 40.

Figure 11:
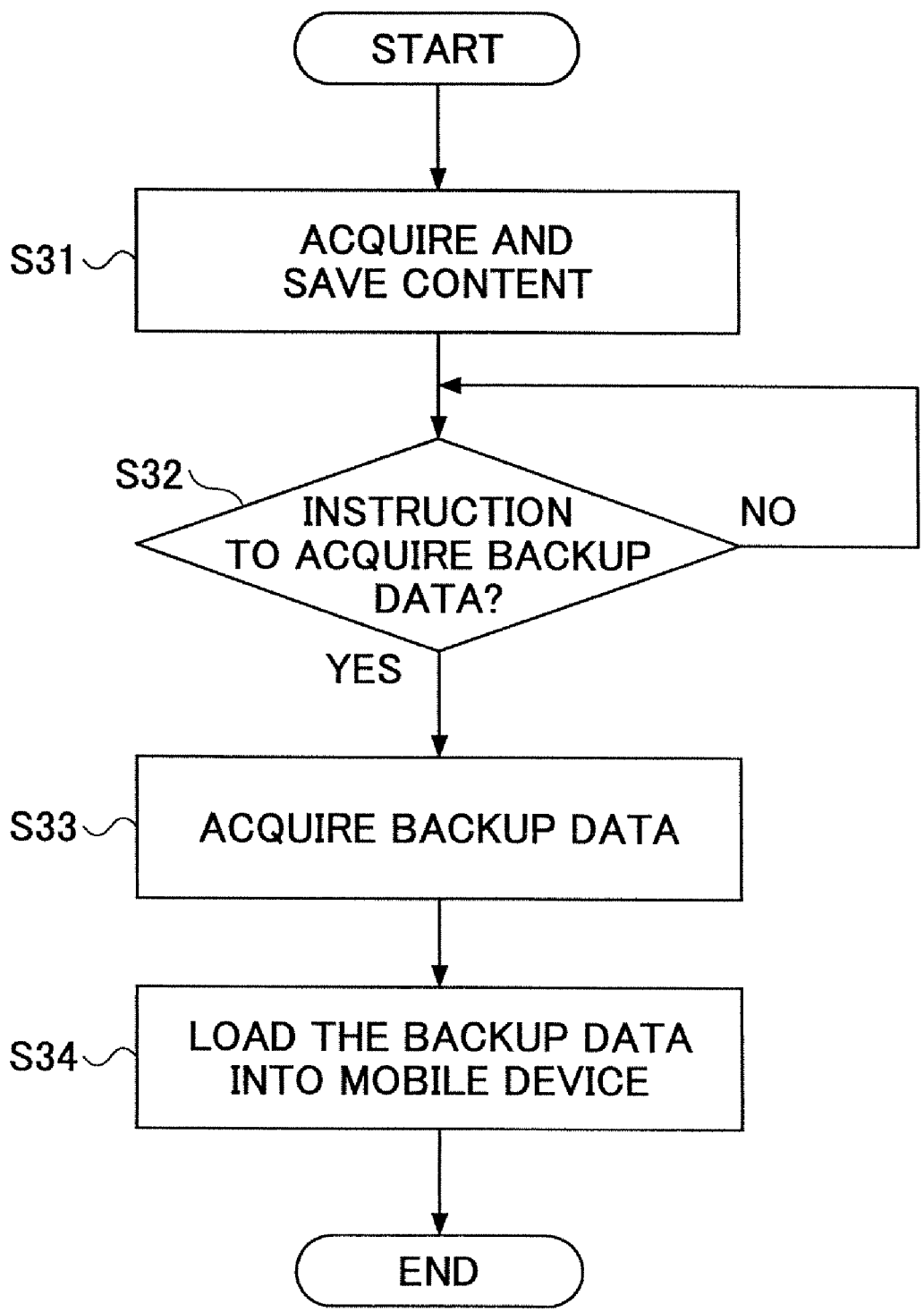
FIG. 11 is a flowchart of acquiring the backup data performed by the DRM agent of a new mobile device.

FIG. 11 is a flowchart of the operations performed by the new mobile device 22 to acquire the backup data. Upon instruction from the user to acquire certain content, the DRM agent 201 of the new mobile device 22 acquires the content and the associated rights information from the content server 30 (S31). The DRM agent 201 stores the content and the rights information in the data storage 202, and manages these items so as to be inaccessible except from the DRM agent 201.

When an instruction to acquire the backup data is input by the user (YES in S32), the mobile device 22 transmits a request for the backup data, together with the ID information of the old mobile device 21 (S33).

Upon receiving the request for the backup data from the mobile device 22, the data preservation server 40 authenticates the mobile device 22, and determines whether there is backup data existing in the block managed under the identifier of the old mobile device 21 in the data preservation area. Two or more backup data items may be stored. If there are any backup data in the corresponding block in the data preservation area, the data preservation server 40 transmits the backup data items to the mobile device 22.

The DRM agent 201 of the mobile device 22 receives the backup data from the data preservation server 40, and takes information items out of the backup data to store them in the appropriate section. The content and the associated rights information are stored in the data storage 202. The status information is managed by the DRM agent 201. The memory information recorded in the annex field of the backup data is taken in as the memory data of the mobile device 22 (S34).

With this operation flow, the previously used information items, including a digital content, the rights information of the digital content, the status information representing the using status of the content, and other related information can be continuously used in a new mobile device even if the old mobile device is replaced by the user with the new one to change the model or after the old device is lost.

Finally, some consideration is made for security. The backup data transmitted between the mobile devices 21, 22 and the data preservation server 40 has to be protected from interception by a third party. Accordingly, an appropriate process has to be provided for the communications between the data preservation server 40 and the mobile devices 21, 22 to keep the communications secret. For example, IPSec (IP security) or SSL (secure socket layer) may be employed as typical security.

The data preservation server 40 needs to authenticate the mobile devices 21 and 22 when accessed from these devices. In authentication, the passwords, the telephone numbers serving as identifiers of the devices, the international mobile subscriber identities (IMSIs), or the electronic certificates may be used, as has been described above.

The data preservation server 40 may work with the content server 30 as necessary when confirming whether the mobile devices 21 and 22 are authorized to use the data preservation server 40. In this case, the content server 30 records identifiers of the mobile devices 21 and 22 when creating the rights information for these devices. The data preservation server 40 queries the content serve 30 about the identifier of a currently accessing mobile device. The data preservation server 40 then receives a replica of the rights information issued to the mobile device from the content server 40 if the mobile device is authorized, and determines that the currently accessing mobile device is authorized to use the data preservation server 40.

This international application is based upon and claims the benefit of the earlier filing date of Japanese Patent Application No. 2005-138957 filed May 11, 2005, the entire contents of which are hereby incorporated by reference.

What is claimed is:

1. A digital rights management system comprising:
a content server configured to store contents created by content creators;
a mobile device configured to acquire and use a desired content from the content server; and
a data preservation server configured to preserve the content used by the mobile device so as to enable the content to be uploaded from the mobile device and downloaded to a respective mobile device;
wherein the content server is further configured to create rights information for the content, and to deliver the content and the rights information to the mobile device in response to a request from the mobile device, the rights information containing availability of backup saving of each of the content, the rights information of the content, status information of the rights information, and annex information; and
the mobile device is further configured to create backup data of an authorized one of the content, the rights information of the content, the status information of the rights information, and the annex information when using the content based on the availability of backup saving and transmit the backup data to the data preservation server for preservation of the backup data.

2. A mobile device comprising:
digital rights management means configured to acquire a content and its associated rights information in which availability of backup saving of each of the content, the rights information of the content, status information of the rights information, and annex information are described from a content server on a network, manage the rights information and determine availability of backup saving of each of the content, the rights information of the content, the status information of the rights information, and the annex information, based on the rights information; and
backup means configured to create backup data items of an authorized one of the content, the rights information of the content, the status information of the rights information, and the annex information, when using the content, and upload the created backup data in a data preservation server on the network, the data preservation server configured to preserve the content used by the mobile device so as to enable the content to be downloaded to a respective mobile device.

3. The mobile device of claim 2, wherein the digital rights management means acquires the backup data from the data preservation server upon input of a backup data acquiring instruction.

4. The mobile device of claim 2, wherein the rights information contains description about restriction on use of the content.

5. The mobile device of claim 2, wherein the backup means includes annex information produced as a result of use of the content in the backup data if it is determined that the rights information indicates the availability of backup saving of the annex information.

6. A content server comprising:
a content saving device configured to store a content created by a content creator;
a determination unit configured to determine whether backup saving of the content is authorized;
a rights information creating unit configured to create rights information that contains a determination result as to availability of the backup saving of each of the content, the rights information of the content, status information of the rights information, and annex information; and
a content/rights information delivering device configured to deliver the content and the rights information in response to a content acquiring request from a mobile device, wherein the backup saving of each of the content is performed at a data preservation server configured to preserve the content used by the mobile device so as to enable the content to be uploaded from the mobile device and downloaded to a respective mobile device.

7. The content server of claim 6, wherein the rights information includes a determination result indicating availability of backup saving and an address of an data preservation server.

8. A digital rights management method, implemented on a content server, comprising the steps of:
registering a content created by a content creator;
determining whether backup saving of each of the content, rights information of the content, status information of the rights information, and annex information is authorized;
creating the rights information for the content, the rights information containing a determination result as to availability of the backup saving of each of the content, the rights information, the status information of the rights information, and the annex information; and
delivering the content and the rights information in response to a content acquiring request from a mobile device, while managing the content and the rights information on a network, wherein the backup saving of each of the content is performed at a data preservation server configured to preserve the content used by the mobile device so as to enable the content to be uploaded from the mobile device and downloaded to a respective mobile device.

9. A digital rights management method, implemented on a content server, comprising the steps of:
acquiring a content and associated rights information from a content server on a network, the rights information containing availability of backup saving of each of the content, the rights information, status information of the rights information, and annex information;
determining whether backup saving of each of the content, the rights information, the status information of the rights information, and annex information is authorized based on the rights information when using the content;
creating backup data of an authorized one of the content, the rights information, the status information of the rights information, and the annex information, and
uploading the backup data in a data preservation server on a network, the data preservation server configured to preserve the content used by the mobile device so as to enable the content to be downloaded to a respective mobile device.

* * * * *